United States Patent [19]
Zanoni

[11] 3,856,412
[45] Dec. 24, 1974

[54] OPTICAL NONCONTACTING GAUGE

[75] Inventor: Carl A. Zanoni, Middletown, Conn.

[73] Assignee: Zygo Corporation, Middlefield, Conn.

[22] Filed: Sept. 6, 1973

[21] Appl. No.: 394,562

Related U.S. Application Data

[63] Continuation-in-part of Ser. No. 368,441, June 8, 1973, and a continuation-in-part of Ser. No. 388,267, Aug. 14, 1973.

[52] U.S. Cl................. 356/167, 356/160, 250/560
[51] Int. Cl. .......................................... G01b 11/00
[58] Field of Search .......... 356/156, 159, 160, 167, 356/169; 250/559, 560, 563

[56] References Cited
UNITED STATES PATENTS
3,744,915 7/1973 Sick ................................... 356/160
3,765,774 10/1973 Petrohilos ...................... 356/159 X

*Primary Examiner*—Ronald L. Wibert
*Assistant Examiner*—Paul K. Godwin
*Attorney, Agent, or Firm*—Milton Zucker

[57] ABSTRACT

An electrooptical sensor is described for providing an output proportional to the cross section of an object, i.e., the diameter of a cylinder. A beam of laser light from a rotating mirror is scanned across the test object. By photoelectrically sensing when the laser beam is modulated on or off by the edge of the object, using the first and second derivatives of the output of the sensor to accurately determine the point of passage, the diameter of the test object can be measured, using an auxiliary photoelectric output obtained by passing a part of the scanning laser beam onto a sensor over a precision grating or scale with markings at least about half the width of the laser beam, to generate a modulated signal whose spatial frequency is independent of variations in the speed of scanning and intensity of the laser beam, squaring off this modulated signal, and then dividing up the squared signal with a vernier during those portions of the signal corresponding to the edges of the test object.

7 Claims, 7 Drawing Figures

OPTICAL NONCONTACTING GAUGE

This application is a continuation-in-part of my said applications Ser. No. 368,441, filed June 8, 1973, and Ser. No. 388,267 filed Aug. 14, 1973.

BACKGROUND OF THE INVENTION

1. Field of the Invention

The present invention relates to apparatus for the accurate measurement of the cross section of an opaque object, such as the diameter of a cylinder. More particularly, the invention relates to noncontacting electrooptical apparatus for this type of measurement which is capable of rapidly and accurately measuring such diameters when the object is moving.

2. The Prior Art

For the accurate measurement of the diameter of soft, delicate, hot, or moving objects, noncontacting sensors must be used. Prior-art devices of this character include capacitive gauges, eddy-current gauges, air gauges, and optical sensors. The nonoptical sensors cannot work at distances of more than a small fraction of an inch without loss of sensitivity.

Optical sensors have advantages due to the nature of light itself. The principal advantages are:

1. They do not require direct mechanical contact between the sensor and the object to be measured;
2. The distance from the sensor to the object to be measured can be large;
3. The response time is limited to that of the photodetector and its electronics; and
4. Light variations are directly convertible to electrical signals.

Prior-art optical sensors employ various techniques, such as shadow projection, diffraction phenomena and scanning light beams.

Devices using scanning light beams move the beam past the object, and record the point at which the object cuts off the light beam, and the point at which the beam no longer is obstructed. The problem is to determine the exact point at which the light is cut off and again appears. A typical laser beam is 1 mm. wide (0.04 inch) and it is necessary to pinpoint when the center of this beam passes by the edges of the object.

One approach has been the use of a constant speed for the beam of light; this requires complete rotary motion through 360°, using an expensive constant-speed device. The accuracy of such devices leaves something to be desired; one such product on the market claims an accuracy of 0.1 percent or 0.0005 inch (0.5 mil), whichever is larger, which is not good enough for many uses.

A second approach eliminates the need for uniform angular-scan rates by measuring the angular-scan portion with some sort of incremental angular encoder such as a pulse generator. This requires the use of an expensive tangent-corrected optics to compensate for the lack of constant speed. In addition, resolution is poorer than in the constant-speed device. One device of this type is reported in the literature as having an accurary of 0.0015 inch at 30 scans per second.

RELATED APPLICATIONS

In my copending application Ser. No. 368,441 filed June 8, 1973, now abandoned entitled "Optical Noncontacting Diameter Gauge," and the continuation-in-part thereof, Ser. No. 388,267 filed Aug. 14, 1973, I have described an improved optical gauge in which I provide (1) a source of radiant energy, most preferably light from a laser, to produce a narrow beam of light; (2) means for scanning this beam of light in a direction perpendicular to its direction of propagation; (3) means for collecting and splitting said scanned beam of light onto (4A) a first photodetector through a precision scale with alternate transparent and opaque bands at least half the width of the diameter of said scanned beam, which produce a sinusoidal signal whose spatial frequency corresponds to the spacings on the precision scale, which spacings preferably correspond to between the diameter of the narrow beam of light and half the diameter, and thence onto means for breaking up said signal from said first photodetector to produce a much higher frequency, locked in phase to the output of said signal-producing means, and (4B) past an opaque test object onto a second photodetector for photoelectrically detecting the modulation of the scanned light beam by said test object; and (5) means connected to the signals from (4A) and (4B) for measuring the position of the scanned light beam in the space of said test object. An accurate measurement of the precise points at which the light beam passes the edges of the test object is obtained by defining the edges as the points at which the first derivative of the energy from the second photodetector is above a fixed value, and the second derivative passes through zero. The preferred scanning means is a rapidly oscillating mirror, which ensure both very rapid measurements, in a fraction of a millisecond, and the ability to repeat measurements every 5 milliseconds or less. The application also discloses that a rotating mirror can be used to replace the oscillating mirror without loss of accuracy, but with a loss of the ability to repeat measurements rapidly. Details of the device when using a rotating mirror are not disclosed; they are given and claimed herein.

OBJECT OF THE INVENTION

This invention aims to provide an electrooptical noncontacting measuring device which has extremely high resolution and linearity, independent of the size of the object being measured.

STATEMENT OF THE INVENTION

In accordance with the instant invention, I provide (1) a source of radiant energy, most preferably light from a laser, to produce a narrow beam of light: (2) rotating means for scanning said beam of light; (3) means for collecting and splitting said scanned beam of light; (4) means for passing part of said light through a precision scale with alternate transparent and opaque bands of equal width, and at least half the width of the diameter of said scanned beam and preferably corresponding to between said diameter and half said diameter, onto a first photodetector to produce a sinusoidal signal whose spatial frequency corresponds to the spacings on the precision scale; (5) means for squaring off said sinusoidal signal; (6) means for generating a fine vernier; (7) means for passing part of said light past an opaque object onto a second photodetector for photoelectrically detecting the modulation of the scanned light beam by said test object; and (8) means connected to the signals from (5), (6) and (7) for measuring the position of the scanned light beam on the space of said test object. An accurate measurement of the precise points at which the light beam passes the edge of the test object is obtained by defining the edge as the point at which the first derivative of the energy from the second photodetector is above a fixed value, and the second derivative passes through zero.

DETAILED DESCRIPTION OF THE INVENTION

Figure 1:
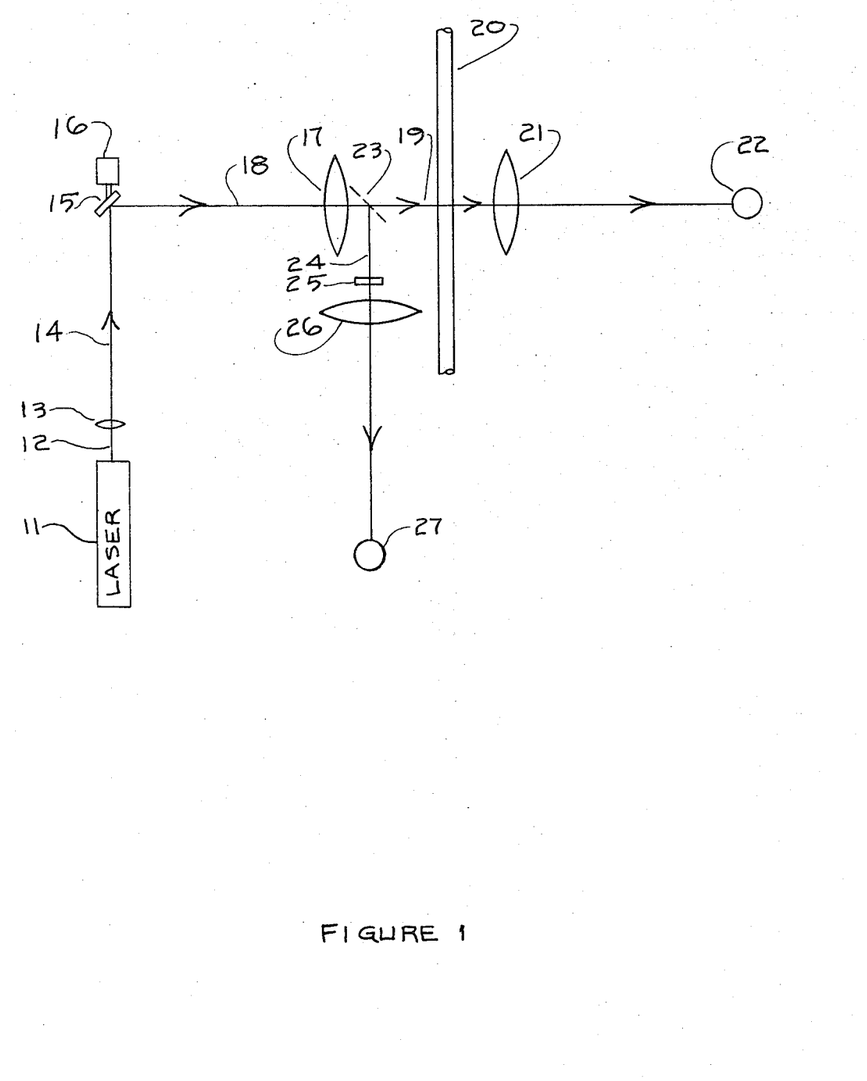
FIG. 1 is a schematic diagram of the electrooptical system of the invention.
Figure 2:
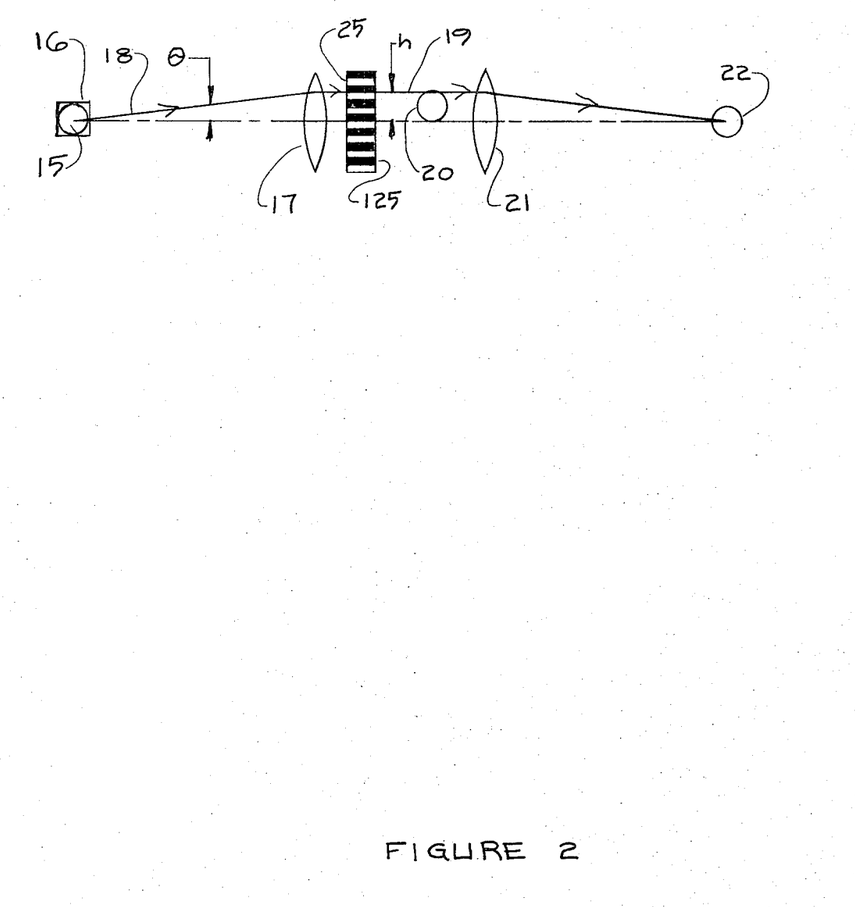
FIG. 2 is a partial side view of the electrooptical system.

Description and Explanation of the Schematic in FIGS. 1 and 2

While the apparatus has application for a wide range of radiation sources, the following description is taken by way of example with respect to an optical measuring system. The term "radiant energy" as used herein includes, but is not limited to, electromagnetic energy of all frequency ranges.

A light source such as a tungsten bulb, xenon bulb, light-emitting diode, laser diode, or other source of radiant energy, and most preferably a gas laser 11, provides optical energy for the narrow, nearly collimated beam 12 in FIG. 1. Lens 13 is used to focus the laser beam so as to provide a beam 14 of uniformly narrow diameter in the measurement region. The light beam 14 is then reflected by a scan mirror 15. This mirror 15 is scanned at a uniform angular speed by an electromechanical transducer 16 such as a synchronous motor preferably synchronous with the vernier clock hereinafter described. The locus of the reflection of the beam 14 on the mirror 15 is made coincident with the on-axis focal point of lens 17. Thus the angularly-scanned light beam 18 is converted to a rectilinearly-scanned beam 19 by lens 17. The light beam 19 scans the measurement region. The linear size of the scan is essentially limited by the aperture diameter of lens 17. A test object, bar, or other opaque object, e.g. in FIG. 1 the bar 20, placed in the measurement region will obstruct the transmission of the light beam 19 to the lens 21 for that portion of the scan which corresponds to the diameter of the bar. When the beam 19 is unobstructed by the object under measurement, the lens 21 focuses the light onto the photodetector 22 (hereinbefore described as the second photodetector). Thus the transitions from light to no-light and no-light to light on the photodetector 22 provide signals which correspond to the passage of the beam 19 past both edges of the object 20 under measurement.

A partially transmitting mirror, or beamsplitter 23, directs a beam 24 which is similar to the beam 19 onto a scale 25. Referring to FIG. 2, the scale 25 is typically a polished glass plate onto which a precision periodic pattern or grating is attached. For example, the scale 25 can be a polished glass plate, onto which a metallic pattern has been deposited to obtain a grating of alternately opaque and transmissive bands 125. The width and spacing of the bands are of equal size. The width of the bands is at least about half the diameter of the beams 19 and 24. The light transmitted by the scale 25 is collected by a lens 26 and focused onto a photodetector 27. The scale 25 provides a fundamental dimensional reference in the measurement space heretofore described as the first photodetector. The output signal of the photodetector 27 is approximately a sinusoidal wave form with fixed spatial frequency but variable temporal frequency.

The output signal of the first photodetector 27, while of fixed spatial frequency, has a temporal frequency $f$ related to the angular speed $\dot{\theta}$ of mirror 15, the focal length F of the lens 17, the width $d$ of a band 125 on the scale 25, and the scan angle $\theta$ of the light beam 18 measured relative to the optical axis of the lens 17. This frequency is represented by the equation $$f = (F \cdot \dot{\theta}/d) \sec^2\theta$$

Because the bands 125 on scale 25 are relatively coarse being approximately half of, to equal to, the width of the light beams 19 and 24, i.e. about ½ to 1 mm., a high resolution vernier is needed.

The width of the bands 125 on the scale 25 must at least be half the width of the beam 24, since if they are substantially finer the wave form obtained from the first photodetector 27 will not be useful, particularly due to noise generated by dust in the apparatus. While the bands 125 can be substantially wider than the beam 24, this introduces some complexity into the wave form of the signal from the photodetector 27 and increases the problem of getting high resolutions from a signal which corresponds to a beam diameter which is most conveniently about 0.04 inch (1 mm.). For this reason, I prefer to have the bands 125 between half the width to approximately equal in width to the diameter of the laser beam, since this produces a regular signal into which a vernier effect can be introduced most simply, to obtain the desired high resolution.

Figure 3:
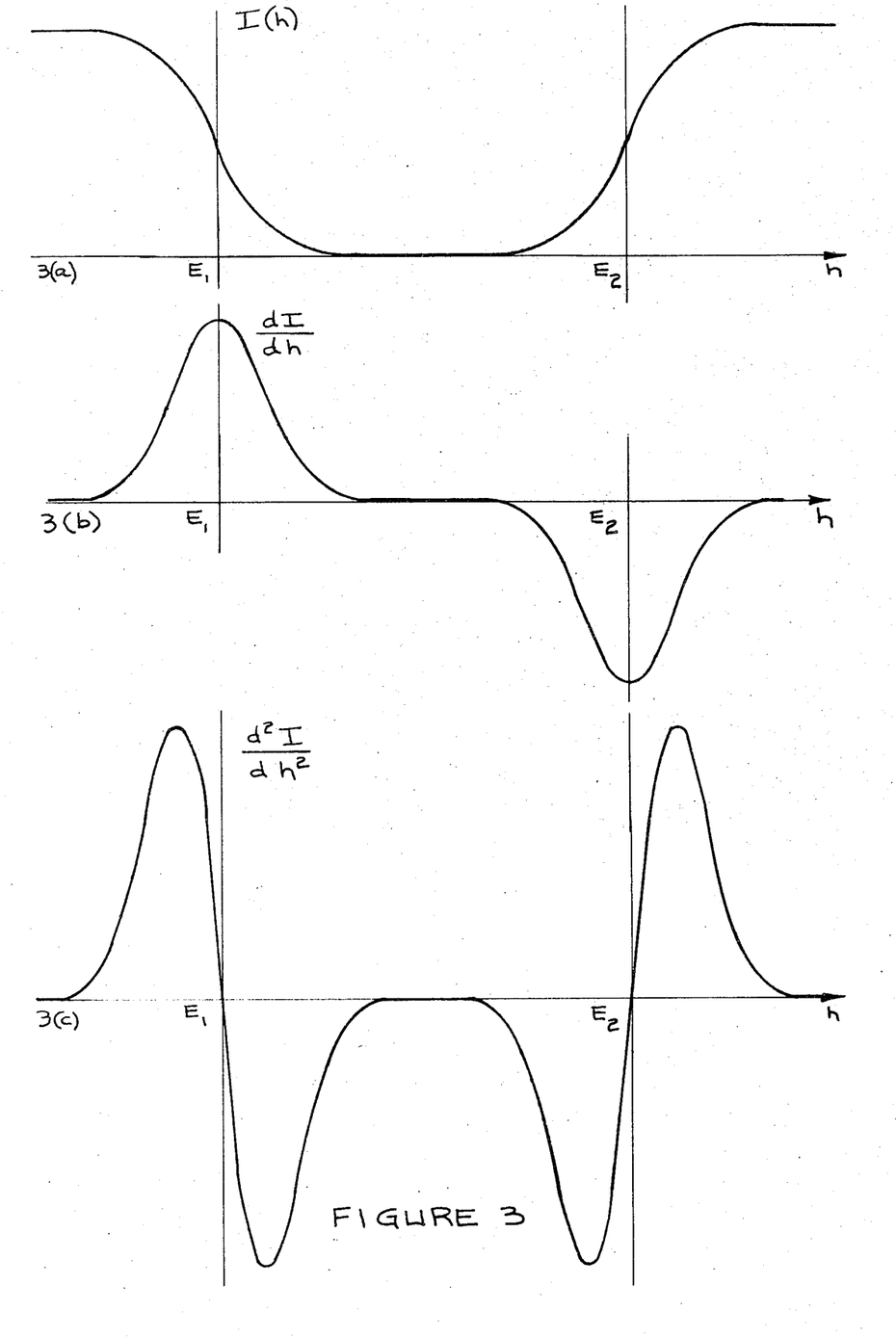
FIG. 3 is a set of curves showing:
 (a) the output of the second photodetector (22) as the beam passes first behind and then out from behind the test object;
 (b) the first derivative of 3(a);
 (c) the second derivative of 3(a).
Figure 4:
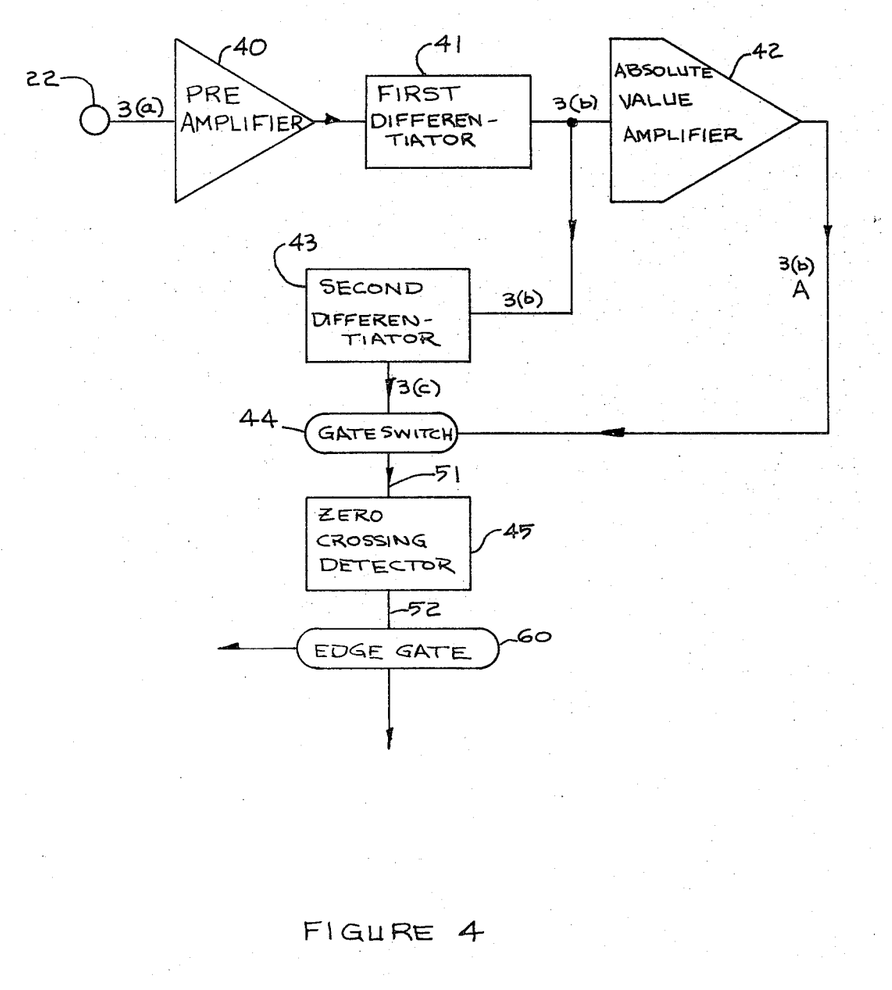
FIG. 4 is a schematic detail of the circuit from the second photodetector 22 to the edgegate 60.

DETAILED DESCRIPTION OF FIGS. 3 AND 4

FIGS. 3 and 4 disclose the means for precisely locating the edges of the test object 20 by means of the output of the second photodetector 22.

Referring to FIG. 3, 3a shows the output of the second photodetector 22 as the beam 19 passes across the test object 20 measuring the intensity I of the light beam against the distance $h$. The beam will pass from maximum intensity to 0 over the width of the beam; the edges of the object are at exactly the inflection points $E_1$ and $E_2$ of curve 3(a). As the photodetectors measure light intensity, it is necessary to determine the points $E_1$ and $E_2$ on the curve 3(a) with maximum certainty, if good resolution is to be obtained.

I determine these points ($E_1$ and $E_2$) most precisely by means of the techniques illustrated in FIGS. 3 and 4. If curve 3(a) is differentiated (and this can be done with conventional electronic circuitry), we get curve 3

(b). The output signal in curve 3(b) is at a maximum at the points $E_1$ and $E_2$ on curve 3(a), since the rates of change are greatest at these points. A further differentiation, to produce the second derivative of the output of the second photodetector 22, gives the curve shown in FIG. 3(c). Here, the curve passes through zero at the points corresponding to $E_1$ and $E_2$. It should be noted that the first derivative is negative during the period which the light beam emerges from behind the test object, but is still at a maximum at the point $E_2$.

By using the outputs of first and second electronic differentiators, I am able to precisely pinpoint the edges of the test object 20, as shown in FIG. 4.

The output signal from the second photodetector 22, curve 3(a), is amplified in a preamplifier 40 and passed into a first differentiator 41 to produce a first derivative signal 3(b). This signal is split; part of it goes to a second differentiator 43 to produce a second derivative signal 3(c). A portion of the signal from the first differentiator 41 goes to an absolute-value amplifier 42.

Figure 6:
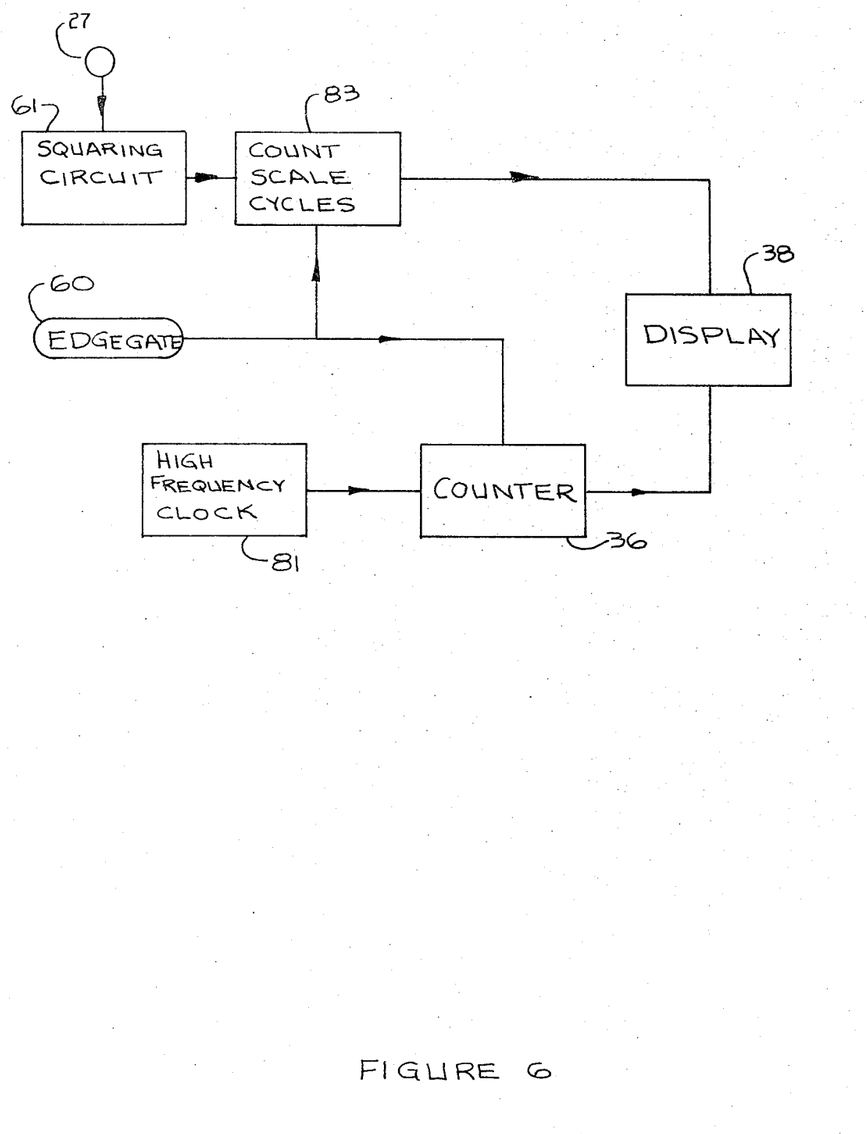
FIG. 6 is a schematic detail of the circuitry needed to combine the signal from the first photodetector 27 with the signal from the edgegate 60 to get the desired measurement, where a tangent-corrected lens is used with the photodetector 27.
Figure 7:
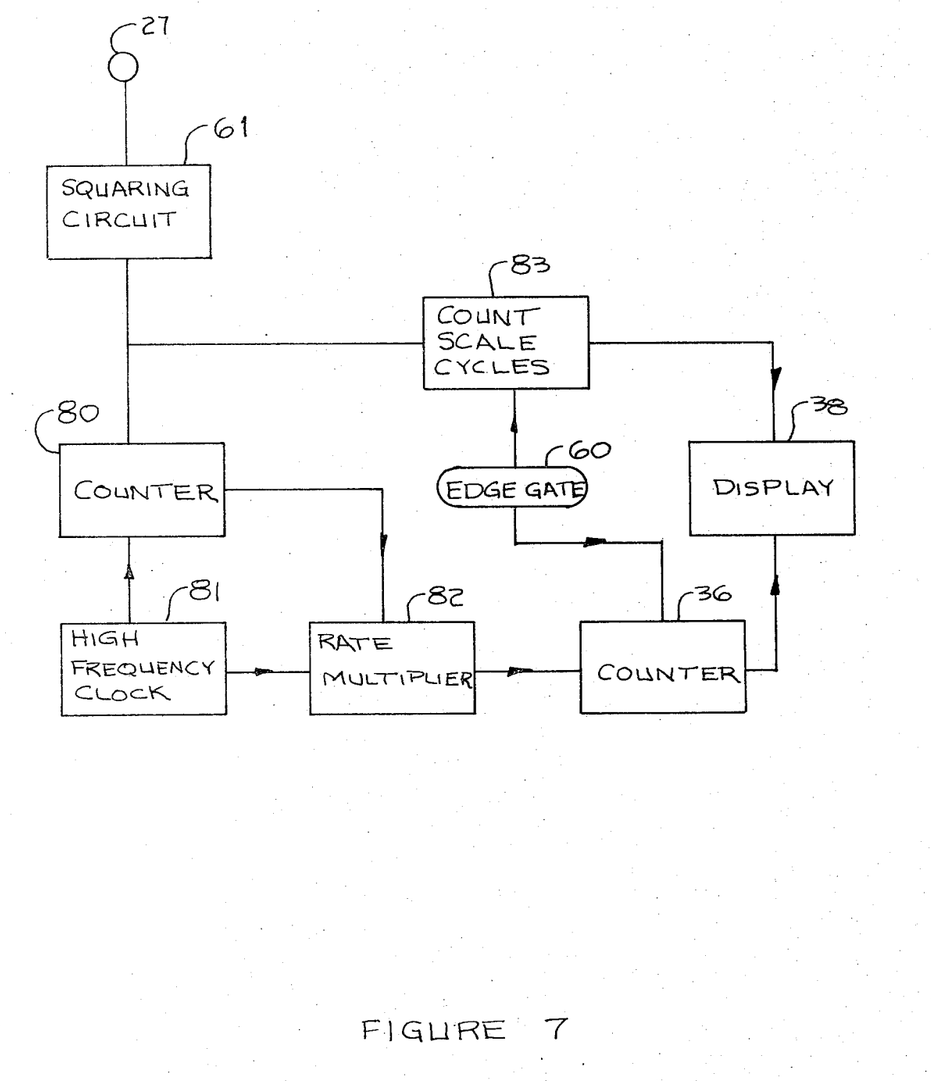
FIG. 7 is a similar schematic to FIG. 6, where an ordinary collimating lens is used with the photodetector 27.

This amplifier 42 is designed to flip the signal 3(b) during the time the beam 19 is emerging from behind the test object. At this point, the first derivative signal 3(b) is opposite in sign to the curve shown in 3(b) and lies below the horizontal axis; the amplifier 42 flips this above the axis, so there is no necessity that the switch 44 be capable of actuation at both a maximum positive and negative alternating current. The switch 44 is designed so that the signal 3(c) from the second differentiator 43 passes only when the rectified signal 3(b)A from the absolute-value amplifier 42 is in the area of the maximum signal. A threshold for this signal is set whereby the gate switch 44 passes the signal 3(c) only during the restricted time at which the signal 3(b)A is above this threshold. The resultant signal 51 passes onto a zero-crossing detector 45; this signal 52 passes to the edgegate 60 to interact with the signal from the first photodetector 27 as shown in FIGS. 6 and 7.

Figure 5:
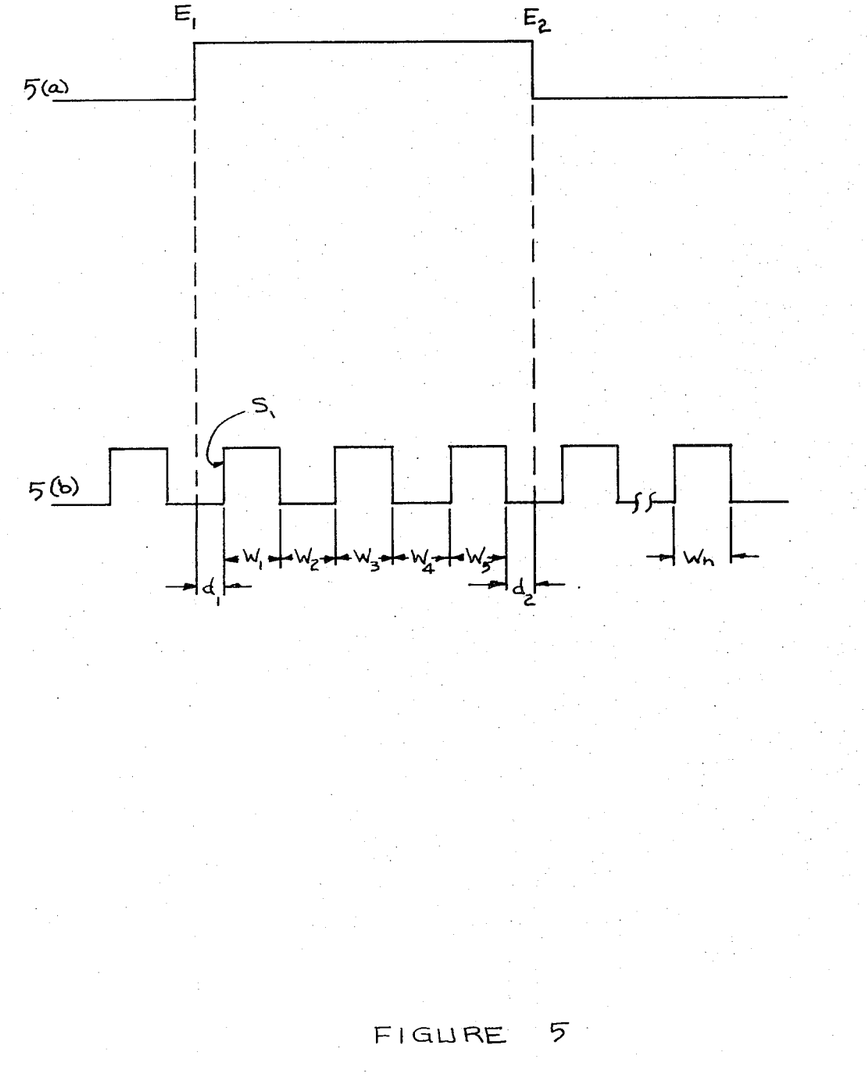
FIG. 5 is a curve showing the signal from the first photodetector 27 after squaring off.

DETAILED DESCRIPTION OF FIG. 5

FIG. 5 discloses the means employed to precisely determine the diameter of the object.

Referring to FIG. 4, 5a shows the output of the edgegate 60 in FIG. 4 as the beam 19 passes across the test object 20. $E_1$ and $E_2$ denote the two edges of the object.

Referring to FIG. 5, 5b shows the output of the first photodetector 27 which has been converted from a sinusoidal waveform to a rectangular waveform by the conventional squaring circuit 61 which first differentiates the signal from the first photodetector 27 and then passes it into a zero crossing detector to get the square form. The widths $W_n$ etc. correspond precisely, i.e. to the extent that an edge can be defined by passing a laser beam over it, to the spacings 125 on the precision scale 25. Thus measurement of the diameter of the test object is carried out by counting the number of full widths $W_n$, and providing a suitable vernier during the spacings that span the edges such that each $W_n$ is divided into say 100 or 1,000 uniformly spaced units. If a uniformly rotating mirror 15 is used in conjunction with a tangent corrected lens, the widths $W_n$ are all equal temporally as well as spatially, so that the vernier can be affected simply by using a fixed, high frequency clock.

The diameter measurement is achieved as follows:

1. Count the number of vernier pulses, $d_1$, from the occurrence of signal $E_1$ to the $S_1$ edge of scale pulse $W_1$;
2. Count the number of full $W_n$ pulses which occur until signal $E_2$ occurs. Let D denote this number;
3. Count the number of vernier pulses, $d_2$ from the $S_5$ edge of such pulse $W_5$ to the signal $E_2$;
4. Total the number $d_1$, D and $d_2$ such that D corresponds to the units digit and the sum $d_1 + d_2$ corresponds to the accumulation of least significant digits.

Note that this technique assures a fixed resolution independent of the diameter of the test object, since the basic uncertainty is restricted to the distances $d_1$ and $d_2$. The widths $W_1 - W_2$ etc. are fixed spatially by the width of the bands 125 and the system optics, being uniform; where the lens 17 is tangent corrected, only the distances $d_1$ and $d_2$ are time-related, and that only during the very short period of measurement. Hence, a very accurate and sustained constant-speed rotation of the mirror is not essential for accurate results; an ordinary inexpensive constant speed motor may be used.

DETAILED DESCRIPTION OF FIG. 6

FIG. 6 shows the schematic block diagram of the means employed to carry out a diameter measurement using a uniformly rotating mirror 15 and a tangent corrected lens 17.

Counter 83 counts the number of full $W_n$ pulses which occur between $E_1$ and $E_2$ signals. Counter 36 counts the number of vernier pulses, i.e. cycles of the clock 81, from the occurrence of signal $E_1$ from the edgegate 60 to the first edge of a full $W_n$ scale pulse as well as the number of vernier pulses from the last edge of a full $W_n$ scale pulse and the occurrence of signal $E_2$. The counts from counters 83 and 36 are combined and displayed in 38.

DETAILED DESCRIPTION OF FIG. 7

If, instead of a tangent corrected lens, an ordinary collimating lens is used for lens 17, then the $W_n$ as depicted in FIG. 5 will vary as a function of $\theta$. The widths will vary as $\sec^2 \theta$. Thus, a fixed frequency clock will not suffice as a vernier since the widths $W_n$ will vary about 1 percent from the $\theta = 0$ to $\theta = 6°$ positions. Nevertheless, by using the precision scale 25, this apparent difficulty can be overcome. Using the fact that the width $W_n$ corresponds to a basic fixed dimension, say ½ to 1 mm., the variations across the field can be measured and compensated with sufficient accuracy. FIG. 7 depicts a schematic of the details of the compensation scheme. In this approach, counter 80 counts the number of cycles from a fixed high frequency clock 81 which fall within each pulse $W_n$ in FIG. 4b. More specifically, counter 80 generates a number equal to the difference between the number of cycles from the high frequency clock 81 and some pre-set number, say 1,000. This difference count is applied to a rate multiplier 82 which in turn modulates the frequency from the high frequency clock 81 so that the frequency out of the rate multiplier varies in such a way that a fixed number of high frequency cycles occur for every $W_n$ pulse. Counter 36 then counts the $d_1$ and $d_2$ distances using the vernier generated by the rate multiplier. Counter 83 counts the number of full widths which occur between signals $E_1$ and $E_2$. The outputs of counters 83 and 36 are combined and displayed as the object diameter in display 38.

The device as illustrated has the great advantage over prior-art devices in that the resolution and accuracy of the device are extremely high. The combination of a precise vernier in the form of a clock synchronous with the scan mirror, ensures optimum high resolution and accuracy. Measurement precision of a few tenths of a mil (i.e. 0.0001 to 0.0003 inch) is readily obtainable. Moreover, the precision is not dependent on the size of the object, as is the case with prior art devices.

The precise position of the test object in the test space is not important; the object need only be somewhere in the scanning zone of the beam. With other than cylindrical objects, the orientation of the object to the scanning beam is of course essential. However, with cylindrical objects, other than gross variations in orientation make very little difference, having only second-order effects on the measurements. Thus, the device can be used for measuring extruding aluminum rod as it comes out of an extruder at high speed, despite wiggling of the extruding rod which both changes the position of the rod and its orientation.

The output signal from the counter, instead of actuating a display, can be used, in conjunction with appropriate servomechanisms, to make desired operations to control the size of the test object.

While a preferred embodiment of the invention has been disclosed, obviously modifications can be made therein, without departing from the scope of the invention as defined in the claims.

What is claimed is:

1. An electrooptical device for measuring the crosssectional width of an opaque object which comprises (1) a source of radiant energy which provides a narrow beam; (2) rotating means for scanning said beam; (3) means for collecting and splitting said scanned beam into first and second portions, and for passing (4A) said first portion of said beam through a precision scale, with alternate transparent and opaque bands of equal width, at least half the width of the diameter of said scanned beam, onto a first photodetector to produce a sinusoidal signal with spatial frequency corresponding to the spacings on the precision scale; (4B) said second portion of said beam past an opaque object onto a second photodetector for photoelectrically detecting the modulation of the scanned light beam by said test object; (5) means for squaring off said sinusoidal signal derived from said first portion of said scanned beam; (6) means for generating a fine vernier; and (7) means connected to the signals from said squaring off means, said vernier, and said second photodetector for measuring the number of full pulses and vernier pulses during the interruption of said second portion of said beam by said test object, to produce a signal corresponding to the cross-sectional width of said test object.

2. The device of claim 1, in which the width of the bands of said precision scale is between half the diameter and the diameter of the scanned beam.

3. The device of claim 1, in which the source of radiant energy is a laser.

4. The device of claim 2, in which means for generating the vernier is a fixed frequency clock, and the scanning means is operated synchronously therewith.

5. The device of claim 2, in which (a) the output from the second photodetector is differentiated to produce signals of maximum intensity adjacent points corresponding to the edges of said test object; (b) a portion of said differentiated signal is further differentiated to produce signals of zero intensity at points corresponding to the edges of said test object; (c) a portion of the first differentiated signal is fed to a switch to which the second differentiated signal is also fed, which switch passes the second differentiated signal only for a limited period adjacent the peaks of said first differentiated signal; and (d) the signal from said switch is fed into a zero-crossing detector to produce a signal which is fed into means (8) of claim 1.

6. The device of claim 4, in which the scanned beam is focused onto the first photodetector through a tangent-corrected lens, and the diameter of the test object is measured by counting the number of full pulses during which the scanned beam is blocked by the test object, and measuring the width of the partial pulses during which the scanned beam is blocked by the test object by counting the number of vernier cycles of the high frequency clock during those portions of the partial pulses.

7. The device of claim 4, in which the scanned beam is focused onto the first photodetector through an ordinary collimating lens and the diameter of the test object is measured by counting the number of full pulses during which the scanned beam is blocked by the test object, and measuring the width of the partial pulses during which the scanned beam is blocked by the test object by recycling a portion of signal from the high frequency clock through a counter which measures the difference between the number of cycles from said high frequency clock and a preset number, and applying the signal from this counter to a rate multiplier which also receives signal direct from the high frequency clock, to produce a modulated output which gives a fixed number of frequency cycles for each full pulse from the first photodetector, and counting the number of frequency cycles from this modulated output during those portions of the partial pulses during which the scanned beam is blocked by the test object.

* * * * *